United States Patent [19]
Park et al.

[11] Patent Number: 6,036,905
[45] Date of Patent: Mar. 14, 2000

[54] METHOD FOR PREPARING POLYESTER FILMS

[75] Inventors: Sang Bong Park, Daegu; Kyung Heum Han; Gi Tak Gam, both of Kyungsangbuk-Do, all of Rep. of Korea

[73] Assignee: Kolon Industries, Inc., Seoul, Rep. of Korea

[21] Appl. No.: 09/029,879

[22] PCT Filed: Dec. 27, 1995

[86] PCT No.: PCT/KR95/00176

§ 371 Date: Mar. 3, 1998

§ 102(e) Date: Mar. 3, 1998

[87] PCT Pub. No.: WO97/09371

PCT Pub. Date: Mar. 13, 1997

[30] Foreign Application Priority Data

Sep. 6, 1995 [KR] Rep. of Korea ............................ 29176

[51] Int. Cl.⁷ ............................ B32B 11/18; C08G 63/12
[52] U.S. Cl. ............................ 264/165; 528/272; 528/275; 528/296; 528/302; 528/308; 528/308.6; 264/177.1; 264/204; 264/291; 264/331.11; 264/DIG. 47
[58] Field of Search ............................ 528/272, 275, 528/296, 302, 308, 308.6; 264/165, 177.1, 204, 291, 331.11, DIG. 47

[56] References Cited

U.S. PATENT DOCUMENTS

| | | | |
|---|---|---|---|
| 4,130,551 | 12/1978 | Bockrath et al. | 528/481 |
| 4,369,207 | 1/1983 | Matsumura et al. | 427/54.1 |
| 4,980,108 | 12/1990 | Suzuki et al. | 264/134 |
| 5,328,745 | 7/1994 | Kurihara et al. | 428/141 |
| 5,391,429 | 2/1995 | Otani et al. | 428/327 |
| 5,478,911 | 12/1995 | Park et al. | 528/285 |

FOREIGN PATENT DOCUMENTS

| | | |
|---|---|---|
| 6128369A | 5/1994 | Japan . |
| 6170911 | 6/1994 | Japan . |

*Primary Examiner*—Samuel A. Acquah
*Attorney, Agent, or Firm*—Birch, Stewart, Kolasch & Birch, LLP

[57] ABSTRACT

A method for preparing polyester films, which comprises addition of partially esterified trimellitate at any stage of the polymerization of polyester through direct esterification or ester interchange, the partially esterified trimellitates resulting from salt formation of partial esterified trimellitic acids which are prepared by partial esterification of aromatic tricarboxylic acids selected from trimellitic acid and trimellitic anhydride with alcohols selected from alkyl alcohols and alkylene alcohols. The polyester film prepared the composition has little voids by virtue of good affinity of the particles originating from the partially esterified trimellitates with polyester and thereby not easily broken when forming films. In addition, it is easy to control particle content and size. Further, fine protrusions can be repetitively formed in the final films, with ease, giving high abrasion resistance and slip property to the film. Besides, the polyester films can be formed in high casting speed attributable to superior electrostatic adhesion.

12 Claims, No Drawings

METHOD FOR PREPARING POLYESTER FILMS

This application is the national phase under 35 U.S.C. §371 of prior PCT International Application No. PCT/KR95/00176 which has an International filing date of Dec. 12, 1995 which designated the United States of America, the entire contents of which are hereby incorporated by reference.

BACKGROUND OF THE INVENTION

1. Field of the Invention

The present invention relates, in general, to a method for preparing polyester film suitable as a base film for magnetic tape and, more particularly, to an improvement in productivity, abrasion resistance and slip properties along with the method.

2. Description of the Prior Art

Polyesters industrially prepared, especially, ones obtained from aromatic dicarboxylic acid and ethylene glycol are extensively used for fibers, films and mold articles by virtue of superior mechanical, physical and chemical properties.

Industrial methods for the preparation of polyesters are typically exemplified by a direct esterification process or ester-interchange process. In the direct esterification, terephthalic acids and ethylene glycols are heated to reaction temperatures ranging from 200 to 280° C. under atmosphere or a pressure, to directly esterify them. On the other hand, the ester-interchange process comprises two steps: first, methyl terephthalates and ethylene glycols are reacted in the presence of catalysts at reaction temperatures ranging from 140 to 240° C., to synthesize prepolymers, that is, bis(beta-hydroxyethyl) terephthalate and/or low molecular weight polymers thereof (hereinafter "esterified compounds"); and, in the second step, the synthesized, esterified compounds are polycondensed in the presence of polymerization catalysts at higher reaction temperatures ranging from 260 to 300° C. in vacuo, so as to obtain high molecular weight polymers.

Polyester films are generally superior in thermal resistance, mechanical properties, dimensional stability, and electric insulation and useful for a plurality of purposes including industrial field, such as magnetic recording film, photofilm, insulating substance and film for deposition, and agricultural field. Also, their consumption amount as a package use for food or other materials has sharply increased because of good chemical properties, transparency, odor preservativity, water resistance and gas barrier.

Slip property and abrasion resistance of polyester film as well as its composition significantly affect the workability in manufacture procedure of polyester film. Particularly, when base films for magnetic tape are manufactured from polyester, these properties are very important to the productivity. For example, if too much diethylene glycol and terminal carboxyl group are contained in a composition for polyester film, thermal stability is degraded, which forces the wiping cycle of extrusion nozzle to be short and thereby lowers productivity. In addition, when melt-extruded sheets are chilled on the surface of a rotary cooling drum, it is difficult to improve the productivity through casting speed if the sheets do not stick fast to the drum. The films thus obtained are nonuniform in thickness, resulting in the production of a magnetic tape with poor electromagnetic characteristics.

And, lack of slip property and abrasion resistance in polyester base film increases the friction between a coating roll and the film upon producing magnetic tapes, leading to generation of crumples and scratches therein. In addition, powder or coating is discontinued by the abrasion of film, which results in drop out of magnetic record.

Recently, it has been indicated that the scratches generated by the contact between the magnetic face and non-magnetic faces at the winding step after the steps of coating of magnetic materials and calendaring degrades the quality of video tapes. Consequently, the polyester film composition which allows the sheets to adhere fast to a drum can improve the productivity and quality of the polyester film and better abrasion resistance and slip property of polyester base film permits the production of higher quality magnetic tape.

Fundamental requirements to polyester film are largely divided into two: workability necessary for production of film, such as chemical, physical and electrical properties of polyester; and particle properties which determines the surface properties of film, such as abrasion resistance and slip properties.

Typically, polyester film is prepared by melt-extruding polyester film composition into a sheet, chilling it on a cooling drum to give an amorphous sheet, and drawing and heat fixing to produce a biaxially oriented film. In order to increase the uniformity of the film thickness and the casting speed, the sheet melt-extruded from extrusion nozzle should adhere fast to the cooling drum when chilling. So-called electrostatic adhesion casting method is well known to be effective for improving the close adhesion between the sheet and the drum, in which static electricity is generated on the surface of an uncured sheet through application of high voltage into a wire electrode set between the extrusion nozzle and the rotary cooling drum and the sheet is chilled on the cooling drum. Uniformity in film thickness is one of the most important factors determining the quality of polyester film. Since the productivity of film directly depends on the casting speed, productivity is improved by increasing the casting speed, which is accomplished through electrostatic adhesion. Many charges on surface of the sheet can improve the electrostatic adhesion. It is known that lowering the specific resistance of polyester composition through modification is effective for the generation of many charges on the surface of the sheet. The specific resistance of polyester composition is determined by the kind, state and quantity of metallic components added in the composition. Generally, the specific resistance of polyester composition is lowered as much as the metal compound does not lose from the melt polyester composition by phosphorous compounds, that is, the metal compound is not deposited from the polyester. Accordingly, in order to lower the specific resistance of polyester composition, the amount of lost metal compound has been reduced, or alkali or alkali earth metal compounds have further been added after esterification or ester interchange reaction.

Such methods can reduce the specific resistance of polyester materials into a certain level at which the electrostatic adhesion can be improved. Recently, film thickness has become further limited, and at the same time, increased productivity has become a requirement higher productivity. However, conventional polyester compositions cannot allow quality film to be produced at high casting speeds. Further, the research directed only to the improvement of electrostatic adhesion may include a danger that metal compounds added deleteriously affect the physical and chemical properties of the polyester composition. Consequently, it is important to improve the electrostatic adhesion without degradation of polyester composition.

Fundamentally, polyester films must have slip property and abrasion resistance. These properties are particularly important in the case that polyester films are used as base films for magnetic tape. To provide polyester film with slip property, fine protrusions have been formed by two methods.

One of these methods, known as "outer particle addition method", comprises adding inactive inorganic particles or crosslinked polymers at any stage of the polymerization process, to generate protrusions or depressions on at least one surface of the final film, as disclosed in Japanese Pat. Pub. Laid-Open No. Sho. 52-78953 and Sho. 64-48836 and Pub. No. Sho. 55-41648, Korean Pat. Pub. No. 91-8997, U.S. Pat. No. 3,821,156 and European Pat. No. 536,602A. The other, known as "internal particle deposition method", is also to form protrusions or depressions on at least one surface of the final film by depositing the product of the reaction between ester interchange reaction catalyst and dicarboxylic acid, phosphorous compound or linear oligomer during the production of polyethylene terephthalate, as disclosed in Japanese Pat. Pub. No. sho 55-20496, sho 49-13234 and sho 50-6493 and Pub. Laid-open No. 60-35022, U.S. Pat. No. 5,006,589 and 4,138,386.

Interned particle deposition method allows superior abrasion resistance but external particle addition method does not. In the latter case, the inactive particles are surface-treated or peculiar particles are used. For instance, colloidal silica particles are modified with glycol as disclosed in Japanese Pat. Pub. Laid-Open Nos. Sho. 63-221158 and Sho. 63-280763 and with coupling agent as in Japanese Pat. Pub. Laid-Open No. Sho. 63-312345. Also, it is reported in Japanese Pat. Pub. Laid-Open No. 62-235353 that the surface of calcium carbonate particles is treated with a phosphorous compound.

The difference between the two methods are further described as follows.

The internal particle deposition method is advantageous in many aspects in that facility investment is low, dispersing agent is not necessary and the film is superior in abrasion resistance. In addition, there are little voids because of the high affinity of the internal particles for polyester, so that highly transparent polyester films with little rupture at film-forming step can be obtained. However, internal particle deposition method has many disadvantages. For example, rough macroparticles are easily formed. Further, it is limited to control the deposition amount between particles, particularly, the content and size of the particles. Furthermore, the polymerization procedure of the internal particle deposition method must be strictly controlled for uniformity in diameter and distribution of particles and for repetitive results.

In contrast with the internal particle deposition method, the external particle addition method requires grinding, classifying and dispersing facilities. A dispersing agent is necessary to prevent coagulation of particles, which has significant deleterious influence on the thermal resistance and electrical properties of the film. Further, the film produced is short of abrasion resistance and defective in affinity between the external particles and polyester, so that voids occur at film-forming step, leading to rupture or opaqueness of film.

At present, with the advance of high performance and productivity, the conditions for operating magnetic tape films become more severe. Under these conditions, the polyester films which are prepared from the compositions of the conventional methods cannot be considered to have sufficient abrasion resistance.

SUMMARY OF THE INVENTION

Accordingly, it is an object of the present invention to overcome the above-mentioned problems encountered in the prior arts and to provide a method for preparing polyester films superior in abrasion resistance and slip property with high productivity.

Based on intensive and thorough research for the combining the internal particle deposition method with the external particle addition method by the present inventors, it was found that the partially esterified trimellitates resulting from, for example, salt formation of partial esterified trimellitic acids which are prepared by partial esterification of aromatic tricarboxylic acids selected from trimellitic acid and trimellitic anhydride with alcohols selected from alkyl alcohols and alkylene glycols, when added at any stage of polyester preparing processes, allow the polyester composition to be low in terminal carboxylic group concentration and in diethylene glycol (DEG) content and high in melting point. It was also revealed that polyester film prepared by the composition has little voids by virtue of good affinity of the particles originating from the partially esterified trimellitates with polyester and thereby not easily broken when forming films. In addition, it is easy to control particle content and size. Further, in accordance with the finding of the present inventors, fine protrusions can be repetitively formed in the final films, with ease, giving high abrasion resistance and slip property to the film. Besides, the polyester films can be formed in high casting speed attributable to the superior electrostatic adhesion according to the present invention.

In accordance with the present invention, there is provided a method for preparing polyester films, wherein bis (beta-hydroxyethyl)terephthalate and/or low molecular weight condensates with a polymerization degree of 2–10 are obtained through direct esterification of terephthalic acid, dicarboxylic acid primarily comprising terephthalic acids, or derivatives thereof with ethylene glycol, glycols primarily comprising ethylene glycol or derivatives thereof, or through ester interchange reaction of dimethyl terephthalate, dialkylterephthalate primarily comprising dimethyl terephthalate or isomeric compounds thereof, or derivatives thereof with ethylene glycol, glycols primarily comprising ethylene glycol or derivatives thereof, and subjected to polycondensation to give polyester which is then molded into films, comprising addition of partially esterified trimellitate at any stage of the preparation of polyester.

DETAILED DESCRIPTION OF THE INVENTION

During polymerization by the conventional internal particle deposition method, particle sources consisting of numerous chemical species are formed by the reaction between phosphorous compound and bis (beta-hydroxyethyl) terephthalate or its low molecular weight polymers in the presence of a catalyst for ester interchange reaction and cohere to themselves to become particles. Since the various chemical species of particle source are different in cohesion, it is highly likely that nonuniform, rough and large particles are formed. Thus, repetitive formation of the fine and uniform particles can be obtained by restricting the amount and kind of the chemical species through severe control of the polymerization process. On the other hand, if particle sources synthesized in exterior rather than in situ are provided during the polymerization process, not only can the chemical species be simplified, but also it is easy to control the amount thereof.

In accordance with the present invention, partial esterified trimellitates exteriorly synthesized are added to serve as particle sources. The internal particles are formed by partially esterified trimellitates alone, or the reaction products of partially esterified trimellitates with one or two species of phosphorous compound or with reaction products of phosphorous compound and bis (beta-hydroxyethyl) terephthalate or its low molecular weight polymer. Therefore, the present invention can form uniform microparticles superior in affinity for polyester without severely controlling the polymerization process and repeats the formation of uniform microparticles with ease.

Phosphorous compound useful for the present invention is a thermal stabilizer which is typically added for the preparation of polyester and is preferably selected from the group consisting of trimethyl phosphate, trimethyl phosphite, phosphoric acid, phosphorous acid and the mixtures thereof.

Partially esterified trimellitates added according to the present invention are products obtained from the salt formation of partially esterified compounds which are prepared through the partial esterification of an aromatic tricarboxylic acid with an alcohol. Examples of the aromatic tricarboxylic acid include trimellitic acid and trimellitic anhydride. The alcohol is selected from the group consisting of alkyl alcohol and alkylene glycol.

In more detail, the partially esterified trimellitates are divided largely into two:

a. partially esterified trimellitates prepared by reaction of 0.9–2.1 moles of alkali metal hydroxide or 0.45–1.05 moles of alkali metal carbonate with a reaction mixture primarily containing partially esterified trimellitic acid resulting from partial esterification of trimellitic acid with alcohol or from partial esterification by ring opening of trimellitic anhydride with alcohol, based on 1 mole of trimellitic acid or trimellitic anhydride; and b. partially esterified trimellitates prepared by reaction of 0.45–1.05 moles of alkaline earth metal halide or transient metal halide with the partially esterified trimellitate obtained in part a above, based on 1 mole of trimellitic acid or trimellitic acid anhydride. Of course, the two species of partially esterified trimellitates may be added alone or in combination with each other.

With regard to alcohol, alkyl alcohol or alkylene glycol is, as mentioned above, used for the partial esterification with aromatic tricarboxylic acid such as trimellitic acid and trimellitic anhydride. For alkyl alcohol, alkyl group contains 1 to 18 carbon atoms. Concrete examples of alkyl alcohol include methyl alcohol, ethyl alcohol, n-propyl alcohol, isopropyl alcohol, n-butyl alcohol, sec-butyl alcohol, tert-butyl alcohol, n-amyl alcohol, acetyl isopropyl alcohol, neohexyl alcohol, isohexyl alcohol, n-hexyl alcohol, heptyl alcohol, octyl alcohol, decyl alcohol, dodecyl alcohol and octadecyl alcohol with a preference of methyl alcohol. For alkylene glycol, alkylene group preferably contains 2–18 carbon atoms. More preferred is ethylene glycol.

As aforementioned, the partially esterified trimellitate is not separated but added as it is contained in the reaction mixture. Alternatively, it is precipitated in a precipitant such as acetone and the precipitate is recovered, washed and dried into powder which is then dispersed in ethylene glycol, to form slurry or a solution. The reaction mixture or slurry or solution containing partially esterified trimellitate may be added at any stage of the polymerization process. Although permitted during or prior to ester interchange reaction, it is preferable to add the partially esterified trimellitate after ester interchange reaction and prior to polycondensation in DMT method, in order to avoid the generation of rough particles. Owing to the same reason, the partially esterified trimellitates are preferably added after the direct esterification in TPA method.

The amount of partially esterified trimellitate to be added can properly be determined by the uses of final films. For example, the partially esterified trimellitate is added in such an amount that metal may range in content from about 0.002 to 0.2% by weight in a final polyester film suitable for magnetic base film.

Polyester of the present invention is typically prepared from dicarboxylic acid and glycol. Examples of dicarboxylic acid include aromatic dicarboxylic acids, such as terephthalic acid, isophthalic acid and naphthalene-2,6-dicarboxylic acid, and ester derivatives of these acids, such as methyl ester, ethyl ester and phenyl ester. Available glycols are exemplified by aliphatic and aromatic glycols, such as ethylene glycol, trimethylene glycol and bisphenol A.

Particularly, the partially esterified trimellitate is effective when polyester is prepared from dicarboxylic acid component consisting of terephthalic acid or dimethyl terephthalate and glycol component consisting of ethylene glycol. That is, the partially esterified trimellitate is added while the esterified compounds primarily comprising bis(beta-hydroxyethyl)terephthalate or its low molecular weight condensates (polymerization degree 2–10) prepared from such components by direct esterification or ester-interchange reaction is polycondensated, in accordance with the present invention.

Therefore, the method of the present invention comprises a typical polycondensation with glycol esters of dicarboxylic acid and/or its low molecular weight condensates that result from direct esterification or ester interchange reaction. For example, polyethylene terephthalate is prepared by reacting about 2 moles of ethylene glycol with about 1 mole of dialkyl terephthalate in the presence of an ester interchange reaction catalyst, such as magnesium acetate at a temperature of about 130 to 250° C. for about 1 to 4 hours under ordinary atmosphere while draining lower alcohols, to give bis(beta-hydroxyethyl)terephthalate and its low molecular weight condensates which are then subjected into polycondensation at a temperature of about 260 to 300° C. under a pressure of 0.1 to 30 torrs for 1 to 5 hours in the presence of a polycondensating catalyst such as antimony trioxide while removing ethylene glycol produced. Alternatively, polyethylene terephthalate is prepared by directly esterifying terephthalic acid with ethylene glycol at a temperature of about 200 to 280° C. for 1 to 4 hours under the atmosphere or a pressure while draining water, the by-product and subjecting bis(beta-hydroxyethyl) terephthalate and its low molecular weight condensates thus obtained into polycondensation at a temperature of about 260 to 300° C. under a pressure of 0.1 to 30 torrs for 1 to 5 hours in the presence of a polycondensating catalyst such as antimony trioxide while removing ethylene glycol produced.

In the polymerization of the present invention, additives are used necessarily and/or optionally according to the uses of the polyester produced.

Multifunctional compounds, such as trimellitic acid, trimesic acid, pyromellitic acid, trimethylolpropane, glycerine, and pentaerythritol, is used to allow the polyester to be crosslinked.

As a terminating agent for polymerization, monofunctional compounds, such as monomethoxy polyethylene glycol, stearyl alcohol, palmitic acid, benzoic acid and naphthalic acid, are added.

Beside such crosslinking agent and terminating agent various additives are added in reaction composition, which are exemplified by a colorant such as carbon black, pigment, dye, a light-quencher such as titanium dioxide, phosphorous compound, a uv absorbent, an antioxidant, an inhibitor against diethyleneglycol formation such as lithium acetate or sodium acetate, a flame retardant, a fluorescent whitening agent, an antistatic agent and the like.

Also, inactive inorganic particles, such as calcium carbonate, silica or alumina, may be added, with the aim of controlling the surface property, when polyester film is prepared from the composition of the present invention.

In the present method, films are molded by typical processes. In more detail, polyester is melt-extruded to give sheet-like objects which, then, become amorphous by chilling it on a cooling drum and are subjected into drawing, thermal fixing and biaxial orientation, to produce polyester films.

A better understanding of the present invention may be obtained in light of following examples which are set forth to illustrate, and are not to be construed to limit, the present invention.

In the following examples, the expression "part" means "weight part" and the physical properties were measured and defined as follows.

A. Average Diameter and Particle Size Distribution of Inactive Inorganic Particles Particle size distribution was determined by a measuring machine such as that sold by Shimazu Co., Ltd. Japan, under the trademark designation "SA-CP3". For obtaining the particle size distribution, the particle size of particles were calculated as the diameter of an equivalent sphere and weights were cumulated beginning with large particle size the particle size distribution was expressed by the diameter ration, $d_{25}/d_{75}$, where $d_{25}$ is the particle size of particles when their cumulative weight is 25%, and $d_{75}$ is the particle size of particles when their cumulative weight is 75% based on their total weight. For average diameter, $d_{50}$, particle size of particles when their cumulative weight is 50% was used.

B. Properties of Polyester Composition a. Intrinsic Viscosity [η]: obtained in ortho-chlorophenol solution at 25° C.

b. Melting Point: measured by a differential scanning calorimeter, a DSC 7 series sold by Perkin-Elmer. Polyester chip was cut to weigh about 10 mg, which was fast heated up to 280° C. in an aluminum sample pan, maintained for 7 min and cooled into −70° C. Thereafter, temperature was raised with a scan rate of 20° C./min. The melting point of the polymer was defined as the highest peak point of the endothermic peak on the DSC thermogram.

c. Concentration of Terminal Carboxyl Group ([COOH]: obtained by titrating a 4 g/dl ortho-cresol solution which was obtained by dissolving the polymer at 100° C., with 0.04 N sodium hydroxide aqueous solution.

d. Content of Diethylene Glycol (DEG) : 1 g of polymer was placed in a 40 ml closed vessel containing 30 ml of methanol and a small amount of zinc acetate, a catalyst, and heated at 210° C. for 3 hours. The solution thus obtained was subjected to chromatography.

e. Electrostatic Cohesion When melt-extruded films were cast under the condition that 5 Kv DC voltage was applied between casting drums by means of an electrode set between the nozzle and the drum and the winding speed of film was 200 m/min, pinning current (mA) flowing between the wire electrode and the drum was measured. Higher value of this pinning current represents better electrostatic cohesion, which allows casting speed to be increased.

C. Properties of Film a. Surface Roughness of Film (SRa): represented by the center line surface roughness which was determined by averaging the values measured 5 times according to sample positions with a noncontagious three dimensional surface roughness meter such as that sold by WYKO, identified as "TOPO-3D" (area: 0.5×0.5 mm², wavelength: 651 nm, magnification: 20). SRa is represented by the following equation:

$$SRa = \left(\frac{1}{N}\right)\sum_i |Zi - Z|$$

$$\text{wherein, } Z = \left(\frac{1}{N}\right)\sum_i Zi;$$

$Z = f(x, y)$, surface height at $x$ and $y$;

$i$ = number of measuring; and $N$ = number of data points measured.

b. Slip Property (Friction Coefficient): evaluated by measuring kinetic friction coefficient with a friction tester meter sold by Toyo seiki Japan, through friction between films. This was carried out according to ASTM D-1894-78, that is, using a sled weighing 80 g at 25° C. and at 60±5% RH.

c. Abrasion Resistance: A knife was brought into vertical contact with a polyester film slit to a width of 12.5 mm. Abrasion resistance was evaluated by the amount of powder adhered to the knife when running the film at a velocity of 60 m/min. Abrasion resistance was graded into three levels as below.

A class: little or almost no powder

B class: a little amount

C class: a considerable amount d. Number of Rough Protrusions: Rough protrusion was considered to show at least three interference rings when observed with a multiple-beam interference microscope at 540 nm. Films were graded as below, according to number of the rough protrusion observed in an area of 100 cm².

A class: 0–ea.

B class: 2–4 ea.

C class: 5–7 ea.

D class: 8 ea or more

EXAMPLES 1 THROUGH 5

Preparation of Partially Esterified Trimellitate

Partially esterified trimellitates were prepared as described below and expressed as "metal-alkyl (or alkylene)-trimellitate" according to the metal and alkyl alcohol (or alkylene glycol), for convenience.

Li-methyl-trimellitate 19.21 parts of trimellitic anhydride and 130 parts of methanol were placed in a reaction vessel and refluxed while heating for 5 hours. After being cooled into room temperature, the mixture was added with 8.39 parts of lithium hydroxide monohydrate and stirred for 30 min. Methanol was removed from the resulting mixture, to obtain viscous gel which was, then, added with excess acetone and well stirred. Soon after standing, the solution was divided into gel layer and acetone layer. Acetone layer was removed. The gel was washed with acetone several times in this manner, to obtain a solid object, which was subsequently filtered and dried in an oven, to give the title compound.

K-methyl-trimellitate 19.21 parts of trimellitic anhydride and 130 parts of methanol were placed in a reaction vessel and refluxed while heating for 5 hours. After being cooled into room temperature, the mixture was added with 13.82 parts of $K_2CO_3$ and 80 parts of distilled water, to form precipitates with $CO_2$ gas arising. After being stirred for 30 min, the precipitate was filtered, washed with acetone several times, and dried in an oven overnight, to give the title compound.
Ca-methyl-trimellitate 19.21 parts of trimellitic anhydride and 130 parts of methanol were placed in a reaction vessel and refluxed while heating for 5 hours. After being cooled into room temperature, the mixture was added with 8.39 parts of lithium hydroxide monohydrate and then, stirred for 30 min. Separately, 11.10 parts of $CaCl_2$ were dissolved in 30 parts of distilled water. Soon after addition of this aqueous solution to the mixture, precipitates were formed, after which stirring for 2–3 min gave highly viscous gel. 50 parts of distilled water were added to the gel. The resulting mixture was poured into an excess acetone to give precipitate which was then filtered. The filtrate was re-washed with acetone and dried overnight in an oven, to give the title compound.
Zn-methyl-trimellitate 19.21 parts of trimellitic anhydride and 130 parts of methanol were placed in a reaction vessel and fluxed while heating for 5 hours. After being cooled into room temperature, the mixture was added with 8.39 parts of lithium hydroxide monohydrate and then, stirred for 30 min. This reaction mixture was added with a zinc chloride solution which was separately prepared by dissolving 14.31 parts of $ZnCl_2$ in 60 parts of methanol and stirred for about 1 hour. Thereafter, addition of 160 parts of acetone led to transparent gel which was then washed with excess acetone many times, to give particles. They were filtered, followed by drying overnight in an oven, to produce the title compound.
Ca-ethylene-trimellitate 19.21 parts of trimellitic anhydride and 100 parts of ethylene glycol were placed in a reaction vessel and fluxed while heating for 1.5 hours. After being cooled into room temperature, the mixture was added with 8.39 parts of lithium hydroxide monohydrate and 50 parts of distilled water and stirred for 30 min. Separately, 11.10 parts of $CaCl_2$ were dissolved in 50 parts of distilled water. This aqueous solution was added to the mixture and stirred for 30 min. The resulting mixture was poured in excess acetone to give precipitate which was then filtered. The filtrate was re-washed with acetone and dried overnight in an oven, to give the title compound.

Preparation of Polyester Film 1,700 parts of dimethylterephthalate, 900 parts of ethylene glycol and 2.4 parts of magnesium acetate tetrahydrate were placed in an ester interchange reaction vessel and heated at 140° C. while stirring. Methanol thus formed was removed for 4 hours while elevating temperature up to 230° C. The mixture free of methanol was added with 12.05 parts of 10 weight percent trimethyl phosphate solution in ethylene glycol and then, with 5 weight percent partially esterified trimellitate solution in ethylene glycol and 5 weight percent antimony trioxide slurry in ethylene glycol in such an amount that the metal contents would be 200 ppm and 185 ppm in the polyethylene terephthalate film finally obtained, respectively. After being transferred to a polycondensation reactor, the reaction mixture was slowly heated up to 285±1° C. for 4 hours with a reduction of pressure finally into 0.8 to 0.9 torr. When viscosity reached a predetermined value, the polycondensation was terminated, after which the product was extruded into cold water through a nozzle provided on the lower part of the reactor to make polyester spaghetti which was then cut into chips.

After being sufficiently dried at 160° C., the polyester chips were melt-extruded at 295° C. through extrusion die into sheets which were then chilled on a cooling drum at 20° C. by electrostatic adhesion method to give amorphous sheets having a crystallinity of not more than 5%. The amorphous sheets were stretched 3.6-times in the machine direction at 100° C. and then, 3.8-times in the transverse direction at 110° C. Such biaxially oriented sheets were thermally treated at 220° C. for 4 seconds, followed by further thermal treatment at 200° C. for 2 second with 3% relaxation, to obtain polyethylene terephthalate films 14 $\mu$m thick.

Table I below summarizes kinds of partially esterified trimellitate, physical properties of polyethylene terephthalate compositions and characteristics of the films according to Examples.

EXAMPLE VI

The procedure of Example II was repeated except that a slurry was separately prepared by dispersing calcium carbonate ($CaCO_3$) particles which had an average diameter ($d_{50}$) of 0.88 $\mu$m and a particle size distribution ($d_{25}/d_{75}$) of 1.6 in 10% ethylene glycol and, just before transfer to the polycondensation reactor, added in such a way that the concentration of calcium carbonate would be 1,800 ppm in the final polyethylene terephthalate film obtained.

The physical properties of the resulting polyethylene terephthalate composition and the polyethylene terephthalate film therefrom were given as shown in Table I below.

EXAMPLE VII

The procedure of Example VI was repeated except that a slurry was separately prepared by dispersing colloidal spherical silica ($SiO_2$) particles which had an average diameter ($d_{50}$) of 0.70 $\mu$m and a particle size distribution ($d_{25}/d_{75}$) of 1.3 in 10% ethylene glycol and, just before transfer to the polycondensation reactor, added in such a way that the concentration of silica would be 1,800 ppm in the final polyethylene terephthalate film obtained.

The physical properties of the resulting polyethylene terephthalate composition and the polyethylene terephthalate film therefrom were given as shown in Table I below.

COMPARATIVE EXAMPLE I

This example was of external particle addition method. A film was produced from a polyethylene terephthalate composition which was prepared in the similar manner to that of Example I except that, instead of partially esterified trimellitate, calcium carbonate ($CaCO_3$) particles which had an average diameter ($d_{50}$) of 0.88 $\mu$m and a particle size distribution ($d_{25}/d_{75}$) of 1.6 in 10% ethylene glycol were added in such a way that the concentration of calcium carbonate would be 1,800 ppm in the final polyethylene terephthalate film obtained.

The physical properties of the resulting polyethylene terephthalate composition and the polyethylene terephthalate film therefrom were given as shown in Table I below.

COMPARATIVE EXAMPLE II

This example was of internal particle deposition method. A film was produced from a polyethylene terephthalate composition which was prepared in the similar manner to that of Example I except that no partially esterified trimellitate was added and lithium acetate dihydrate and calcium acetate monohydrate were added as ester interchange reaction catalysts in such a way that the concentrations of the lithium and calcium both would be 100 ppm in the final polyester film and phosphorous acid and trimethyl phosphate were added at an amount of 0.54 and 4.82 parts, respectively.

The physical properties of the resulting polyethylene terephthalate composition and the polyethylene terephthalate film therefrom were given as shown in Table I below.

TABLE I

| | | | Properties of PET composition | | | | | Properties of PET films | | | |
|---|---|---|---|---|---|---|---|---|---|---|---|
| Exam- No. | PET[1] | IIP[2] | [η] (dl/g) | MP[3] (° C.) | [COOH] (eq/t) | DEG (wt %) | Pinning Current (mA) | SRa (μm) | F.C.[4] | A.R.[5] | No. of R.P.[6] |
| I | Li-[7] | — | 0.605 | 254.9 | 22.1 | 0.71 | 11.7 | 0.011 | 0.30 | A | A |
| II | K-[8] | — | 0.611 | 254.2 | 23.5 | 0.75 | 11.2 | 0.009 | 0.32 | A | A |
| III | Ca-[9] | — | 0.603 | 254.6 | 22.5 | 0.73 | 9.8 | 0.016 | 0.30 | A | B |
| IV | Zn-[10] | — | 0.596 | 254.9 | 33.1 | 0.83 | 12.6 | 0.008 | 0.33 | A | A |
| V | Ca-[11] | — | 0.601 | 254.4 | 22.6 | 0.70 | 8.9 | 0.018 | 0.31 | B | B |
| VI | K-[12] | $CaCO_3$ | 0.605 | 254.0 | 24.2 | 0.78 | 11.3 | 0.013 | 0.29 | B | A |
| VII | K-[13] | $SiO_2$ | 0.602 | 254.1 | 23.7 | 0.77 | 11.2 | 0.012 | 0.28 | B | A |
| C.I. | — | $CaCO_3$ | 0.599 | 252.5 | 45.2 | 1.12 | 6.5 | 0.007 | 0.40 | C | C |
| C.II | — | — | 0.607 | 251.0 | 36.7 | 1.06 | 7.8 | 0.010 | 0.35 | B | D |

*PET[1]: Partially esterified Trimellitate
IIP[2]: Inactive Inorganic Particle
MP[3]: Melting Point
F.C.[4]: Friction Coefficient
A.R.[5]: Abrasion Resistance
R.P.[6]: Rough Protrusions
Li-[7]: Li-Methyl-Trimellitate
K-[8]: K-Methyl-Trimellitate
Ca-[9]: Ca-Methyl-Trimellitate
Zn-[10]: Zn-Methyl-Trimellitate
Ca-[11]: Ca-Methyl-Trimellitate
K-[12]: K-Methyl-Trimellitate
K-[13]: K-Methyl-Trimellitate Other features, advantages and embodiments of the present invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

What is claimed is:

1. A method for preparing polyester films, wherein bis(beta-hydroxyethyl) terephthalate and/or low molecular weight condensates with a polymerization degree of 2–10 are obtained through direct esterification of terephthalic acid with ethylene glycol, or through ester interchange reaction of dimethyl terephthalate with ethylene glycol, and subjected to polycondensation to give polyester which is then molded into films, comprising addition of partially esterified trimellitate at any stage of the preparation of polyester.

2. A method in accordance with claim 1, wherein said partially esterified trimellitate is selected from the group consisting of:
   a. partially esterified trimellitates prepared by reaction of 0.9–2.1 moles of alkali metal hydroxide or 0.45–1.05 moles of alkali metal carbonate with a reaction mixture resulting from partial esterification of trimellitic acid with alcohol or from partial esterification by ring opening of trimellitic anhydride with alcohol, based on 1 mole of trimellitic acid or trimellitic anhydride;
   b. partially esterified trimellitates prepared by reaction of 0.45–1.05 moles of alkaline earth metal halide or transient metal halide with the partially esterified trimellitate obtained in part a above, based on 1 mole of trimellitic acid or trimellitic anhydride; and
   c. the mixtures thereof.

3. A method in accordance with claim 2, wherein said partially esterified trimellitate is added as reaction mixtures, per se, without being separated, or in a form of a slurry or a solution in ethylene glycol.

4. A method in accordance with claim 1, wherein said partially esterified trimellitate is added after ester interchange reaction but prior to polycondensation reaction.

5. A method in accordance with claim 1, wherein said partially esterified trimellitate is added after direct esterification.

6. A method in accordance with claim 2, wherein said alcohol is an alkyl alcohol which has an alkyl group containing 1–18 carbon atoms or an alkylene glycol which has an alkylene group containing 2–18 carbon atoms.

7. A method in accordance with claim 6, wherein said alcohol is methyl alcohol or ethylene glycol.

8. A method in accordance with claim 1, wherein said partially esterified trimellitate is added to the extent of that the metal content amounts to 0.002–0.2% by weight based on the final film.

9. A method in accordance with claim 2, wherein said partially esterified trimellitate is added after ester interchange reaction but prior to polycondensation reaction.

10. A method in accordance with claim 3, wherein said partially esterified trimellitate is added after ester interchange reaction but prior to polycondensation reaction.

11. A method in accordance with claim 2, wherein said partially esterified trimellitate is added after direct esterification.

12. A method in accordance with claim 3, wherein said partially esterified trimellitate is added after direct esterification.

* * * * *